(12) United States Patent
Bhatnagar et al.

(10) Patent No.: US 11,019,899 B2
(45) Date of Patent: Jun. 1, 2021

(54) ELECTRONIC LUGGAGE DEVICE

(71) Applicant: ARLO SKYE, Inc., New York, NY (US)

(72) Inventors: Mayur Bhatnagar, New York, NY (US); Mauricio Issa Llano, Rego Park, NY (US)

(73) Assignee: ARLO SKYE, Inc., New York, NY (US)

( * ) Notice: Subject to any disclaimer, the term of this patent is extended or adjusted under 35 U.S.C. 154(b) by 365 days.

(21) Appl. No.: 16/162,910

(22) Filed: Oct. 17, 2018

(65) Prior Publication Data

US 2019/0045897 A1 Feb. 14, 2019

Related U.S. Application Data

(63) Continuation-in-part of application No. 15/096,354, filed on Apr. 12, 2016, now Pat. No. 10,130,152.

(51) Int. Cl.
*A45C 13/42* (2006.01)
*A45C 13/26* (2006.01)
(Continued)

(52) U.S. Cl.
CPC ............... *A45C 13/42* (2013.01); *A45C 5/14* (2013.01); *A45C 13/001* (2013.01); *A45C 13/262* (2013.01); *A45C 13/28* (2013.01); *A45C 15/00* (2013.01); *H01M 10/0525* (2013.01); *H01M 50/20* (2021.01); *H02J 7/00* (2013.01); *H02J 7/0045* (2013.01); *H01M 2250/30* (2013.01);
(Continued)

(58) Field of Classification Search
CPC ........... A45C 13/28; A45C 5/14; A45C 13/12; A45C 13/42; A45C 13/262; H01M 10/0525; H01J 7/0045
USPC ........................................................ 190/18 A
See application file for complete search history.

(56) References Cited

U.S. PATENT DOCUMENTS 3,748,185 A 7/1973 Cooper et al.
4,163,484 A 8/1979 Delaney
(Continued)

FOREIGN PATENT DOCUMENTS

CN 204070957 U 1/2015
WO 2014073971 A1 5/2014
WO 2015183949 A1 12/2015

*Primary Examiner* — Sue A Weaver
(74) *Attorney, Agent, or Firm* — Maier & Maier, PLLC

(57) ABSTRACT

According to an exemplary embodiment, an electronic luggage device may be disclosed. The electronic luggage device may be fully TSA compliant. The device may be capable of communicating both wirelessly and by wired connection(s) to other devices. The electronic luggage device may also charge other devices by battery and in turn be charged by other electric power facilities. The electronic luggage device may have GPS capabilities, an intelligent "sleep-mode," multiple various charging and communicatory ports, a recessed telescoping handle fixture, a hidden battery compartment, and a high capacity removable battery. The removable battery may be retained by any locking means understood by a person having ordinary skill in the art. The removable battery may be automatically or manually ejected. This may be accomplished by a spring-loaded force, a slot and rail system, or equivalents as would be understood by a person having ordinary skill in the art.

18 Claims, 15 Drawing Sheets

(51) Int. Cl.
  *A45C 13/28* (2006.01)
  *H01M 10/0525* (2010.01)
  *H02J 7/00* (2006.01)
  *A45C 5/14* (2006.01)
  *A45C 13/00* (2006.01)
  *A45C 15/00* (2006.01)
  *H01M 50/20* (2021.01)
  *H02J 50/20* (2016.01)
  *H02J 7/02* (2016.01)
  *H02J 50/12* (2016.01)
  *H02J 50/10* (2016.01)
  *H02J 7/34* (2006.01)

(52) U.S. Cl.
  CPC ............... *H02J 7/025* (2013.01); *H02J 7/342* (2020.01); *H02J 50/10* (2016.02); *H02J 50/12* (2016.02); *H02J 50/20* (2016.02)

(56) References Cited

U.S. PATENT DOCUMENTS

| | | | |
|---|---|---|---|
| 5,533,601 A | 7/1996 | Wang | |
| 7,682,734 B2 | 3/2010 | Jeon | |
| 7,954,610 B2 | 6/2011 | Dayton | |
| 8,067,860 B2 | 11/2011 | Hoffmann | |
| 8,545,042 B2 * | 10/2013 | Lu | H01M 10/488 |
| | | | 362/194 |
| 8,663,531 B2 | 3/2014 | De Taeye | |
| 10,219,599 B2 * | 3/2019 | Korey | A45C 5/14 |
| 10,321,744 B2 | 6/2019 | Munoz | |
| 10,592,913 B2 * | 3/2020 | Price | G06Q 30/0204 |
| 2006/0073377 A1 | 4/2006 | Al-Hallaj | |
| 2007/0017765 A1 | 1/2007 | Robinson et al. | |
| 2007/0159781 A1 | 7/2007 | Zbikowski | |
| 2009/0040048 A1 | 2/2009 | Locker et al. | |
| 2009/0205235 A1 | 8/2009 | Scicluna | |
| 2010/0231161 A1 | 9/2010 | Brown | |
| 2012/0006719 A1 | 1/2012 | Celona | |
| 2012/0152677 A1 | 6/2012 | Lu | |
| 2012/0262117 A1 | 10/2012 | Ferber | |
| 2013/0126286 A1 | 5/2013 | Chehebar | |
| 2013/0248309 A1 | 9/2013 | Lein et al. | |
| 2014/0277841 A1 | 9/2014 | Klicpera et al. | |
| 2015/0040622 A1 | 2/2015 | Meersschaert | |
| 2015/0047941 A1 | 2/2015 | Wax | |
| 2015/0055278 A1 | 2/2015 | Baschnagel | |
| 2015/0101958 A1 | 4/2015 | Cross | |
| 2015/0318716 A1 | 11/2015 | Pickens | |
| 2015/0348347 A1 * | 12/2015 | Diz | B60B 5/02 |
| | | | 340/5.61 |
| 2016/0210094 A1 * | 7/2016 | Nishikawa | H04N 1/00411 |
| 2016/0276634 A1 | 9/2016 | Kong | |
| 2016/0315495 A1 * | 10/2016 | Lee | H01M 2/1022 |
| 2017/0093203 A1 | 3/2017 | Curescu | |
| 2017/0127782 A1 | 5/2017 | Korey | |
| 2017/0324437 A1 * | 11/2017 | Ruttler | A61B 5/02438 |
| 2018/0177075 A1 * | 6/2018 | Kweon | H02J 7/0042 |

* cited by examiner

ELECTRONIC LUGGAGE DEVICE

CROSS-REFERENCE TO RELATED APPLICATIONS

This application is a continuation-in-part of U.S. patent application Ser. No. 15/096,354, filed Apr. 12, 2016, the entire contents of which is incorporated herein by reference.

BACKGROUND

Historically individuals have traveled with varying types of luggage and accessories. Over the years luggage has evolved for functional, design, and even regulatory reasons. For example, the Transportation Security Administration ("TSA") has promulgated luggage and accessory regulations concerning battery types, sizes, and security locks. Notably, spare lithium batteries (both lithium metal and lithium ion/polymer) may be prohibited in checked baggage. As luggage evolves to meet the growing needs of an increasingly mobile world, consumers are faced with tough choices of convenience and regulatory compliance. For example, smart phones, tablets, PDA's, laptops, and other portable equipment requiring charging may be difficult to travel with let alone maintain in a charged state. While batteries are not generally required to be removed from these devices it is important to note that spare batteries may not be allowed in luggage compartments in certain situations. Lithium batteries may not be allowed in checked luggage because a fire involving the lithium battery may involve an extreme amount of heat. Since checked baggage is inaccessible during flight, it would not be possible to intervene in the event that a fire suppression system malfunctioned.

Presently consumers may require a convenient way to travel with a spare high capacity battery, such as a lithium battery, that may be used to charge portable electronic devices. Furthermore, any battery that may be included will need to be TSA compliant. This disclosure may provide a solution to competing interests facing travelers and the shortcomings of existing luggage.

SUMMARY

According to an exemplary embodiment, an electronic luggage device may be disclosed. The electronic luggage device may have a luggage enclosure with a top and bottom side. A plurality of rotatable wheels may be affixed to the bottom side of the luggage enclosure. A handle housing fixture may be affixed to the top side of the luggage enclosure. The handle housing fixture may be further composed of a telescoping handle in which the telescoping handle may slide up and down through void spaces of the handle housing fixture. The handle housing fixture may be coupled to a battery-housing fixture. The battery-housing fixture may be affixed directly underneath the handle housing fixture such that it is disposed entirely within the luggage enclosure. The battery-housing fixture may contain a removable high capacity battery such as a lithium ion battery. The battery may have a plurality of electronic ports to charge external electronic devices. The battery may also have at least one electronic port to receive an external electric charge.

According to an exemplary embodiment, an electronic luggage device may be disclosed. The electronic luggage device may have a luggage enclosure with a top and bottom side. A plurality of rotatable wheels may be affixed to the bottom side of the luggage enclosure. A top handle may be affixed to the top of the luggage enclosure and a side handle may be affixed to the side of the luggage enclosure. At least one side lock may be affixed to the side of the luggage enclosure thereby preventing unauthorized access to the luggage enclosure. The luggage enclosure may optionally be detailed with a plurality of protruding bumpers and a plurality of recessed grooves. A handle housing fixture may be affixed to the top side of the luggage enclosure such that the handle housing fixture is recessed thereby providing a substantially flush finish with the luggage enclosure. The handle housing fixture may be further composed of void spaces that allow a telescoping handle to slide up and down through the handle housing fixture. The handle housing fixture may optionally be coupled to a battery-housing fixture. The battery housing fixture may be coupled directly underneath the handle housing fixture such that it is disposed entirely within the luggage enclosure and the electronic ports may be accessible adjacent to the telescoping handle. The battery-housing fixture may be obscured from view by a battery-housing lid. The battery-housing lid may be operable by a lid latch mechanism between an open and closed state. The battery-housing fixture may contain a removable high capacity battery such as a lithium ion battery. The battery may be removable by operation of a battery containment mechanism and or a spring. The battery may have a plurality of electronic ports to charge external electronic devices. The battery may also have at least one electronic port to receive an external electric charge. The battery may optionally include a GPS transceiver. The battery-housing fixture may further feature an onboard display indicator screen, or may communicate status indications to an external display.

BRIEF DESCRIPTION OF THE FIGURES

Advantages of embodiments of the present invention will be apparent from the following detailed description of the exemplary embodiments. The following detailed description should be considered in conjunction with the accompanying figures in which:

Exemplary FIG. 1 may show an exemplary embodiment of an electronic luggage device;

Figure 1:
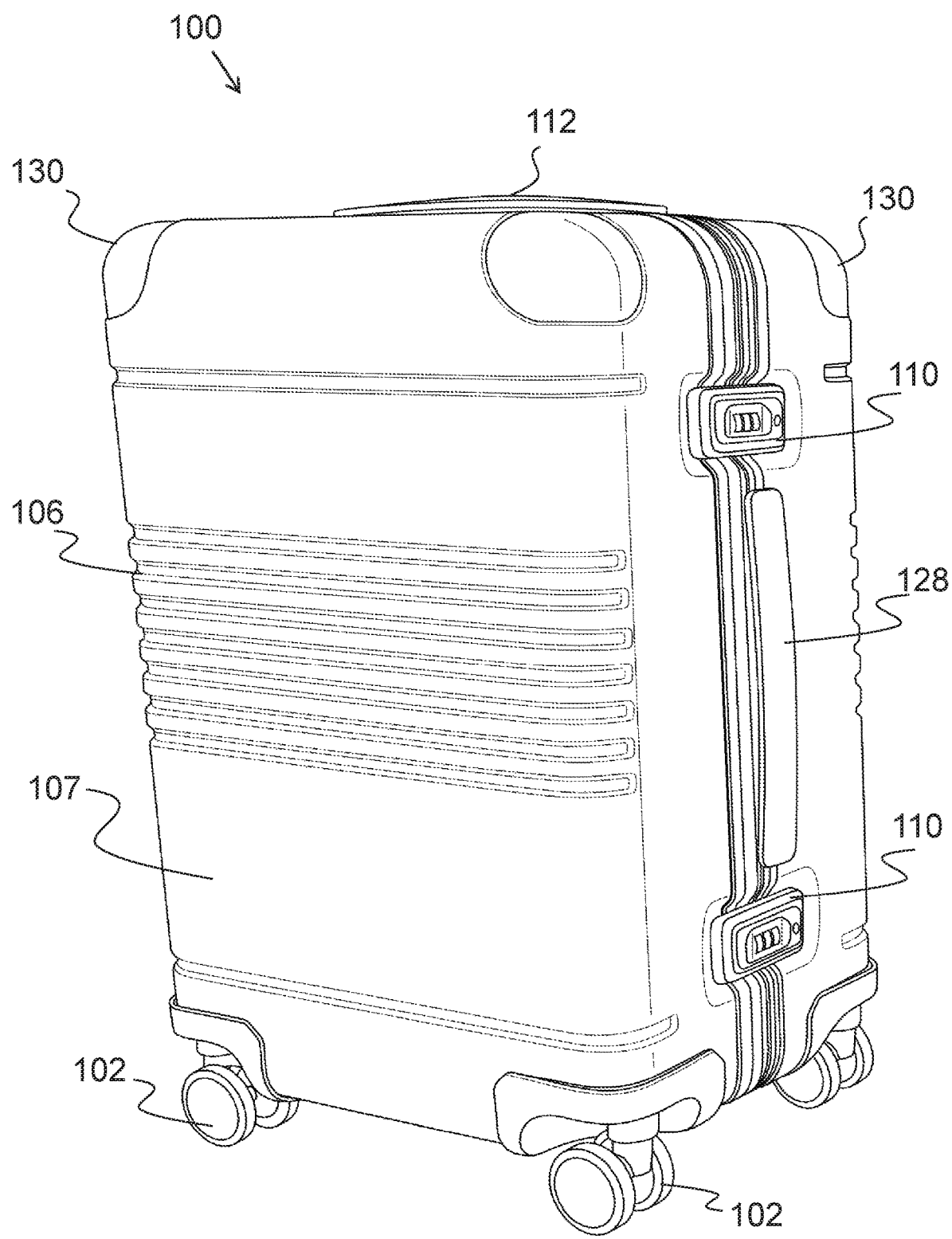
Figure 2:
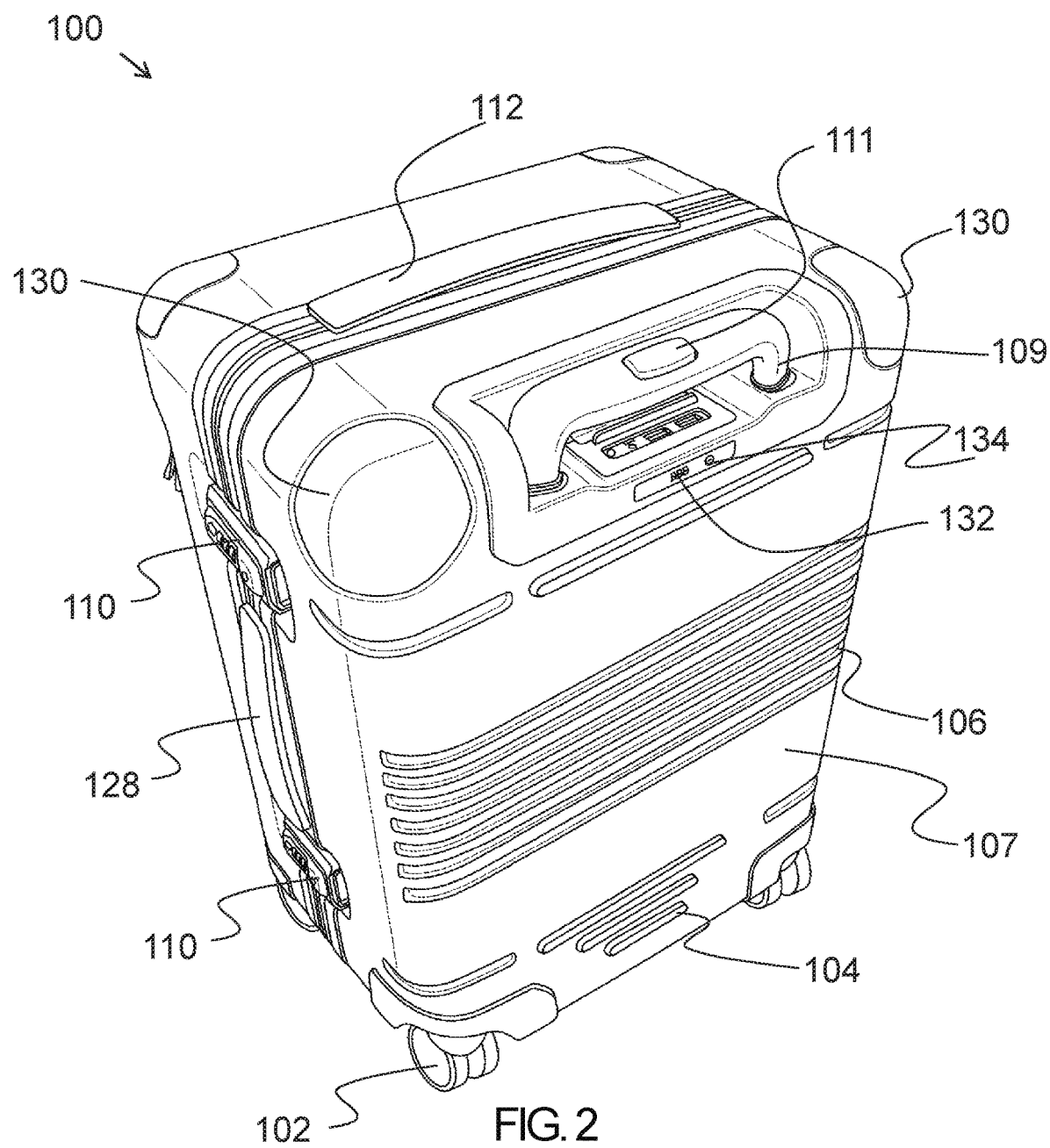
Figure 3:
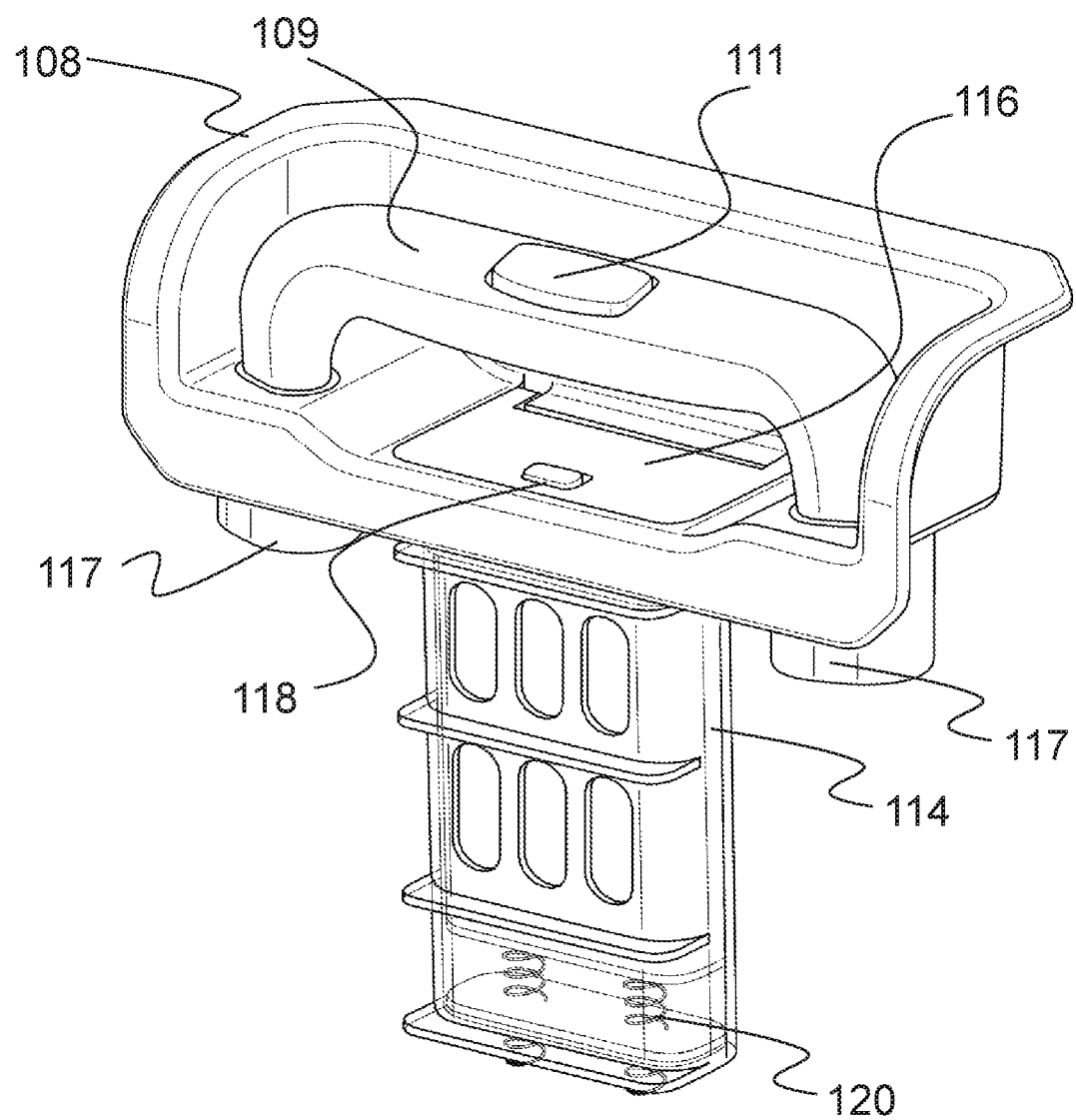
Figure 4:
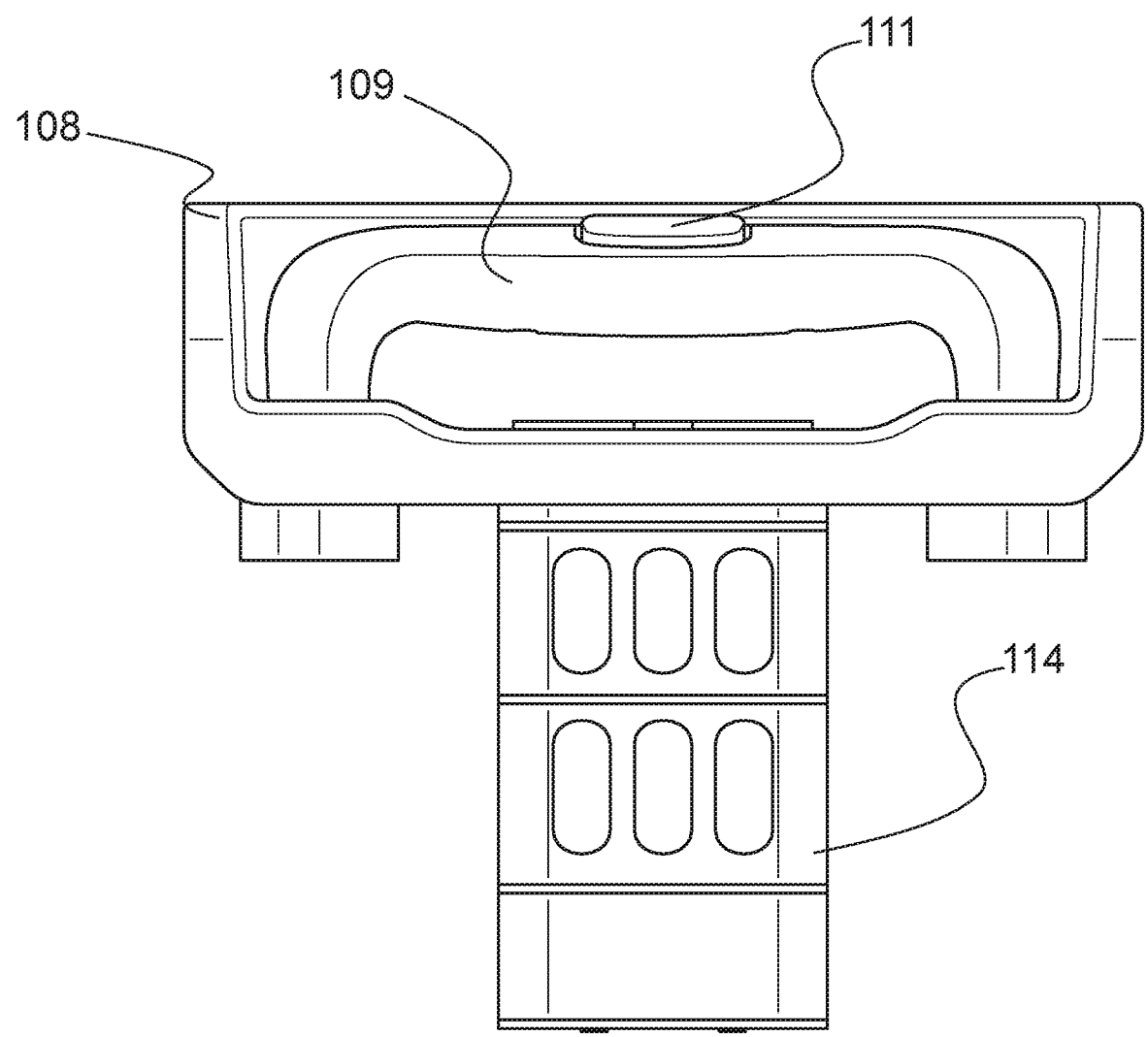
Figure 5:
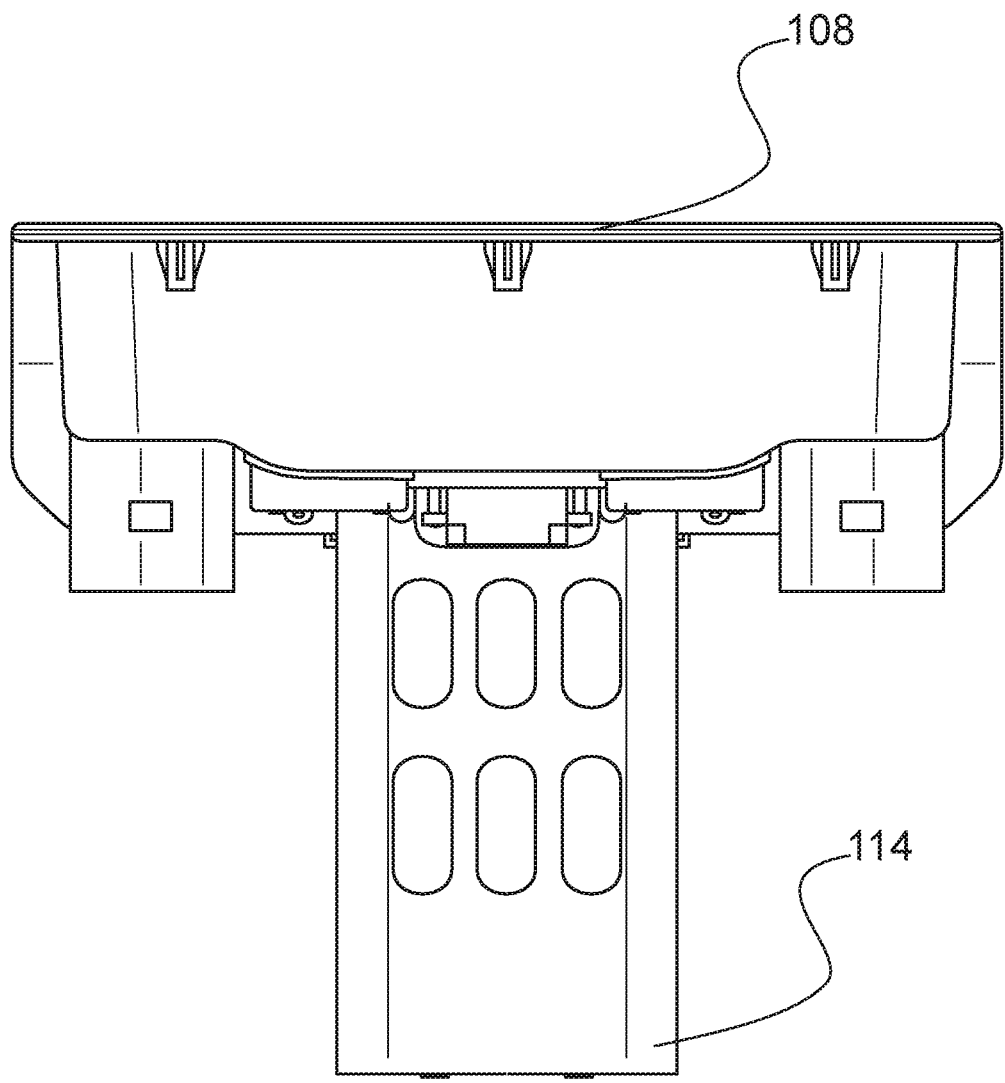
Figure 6:
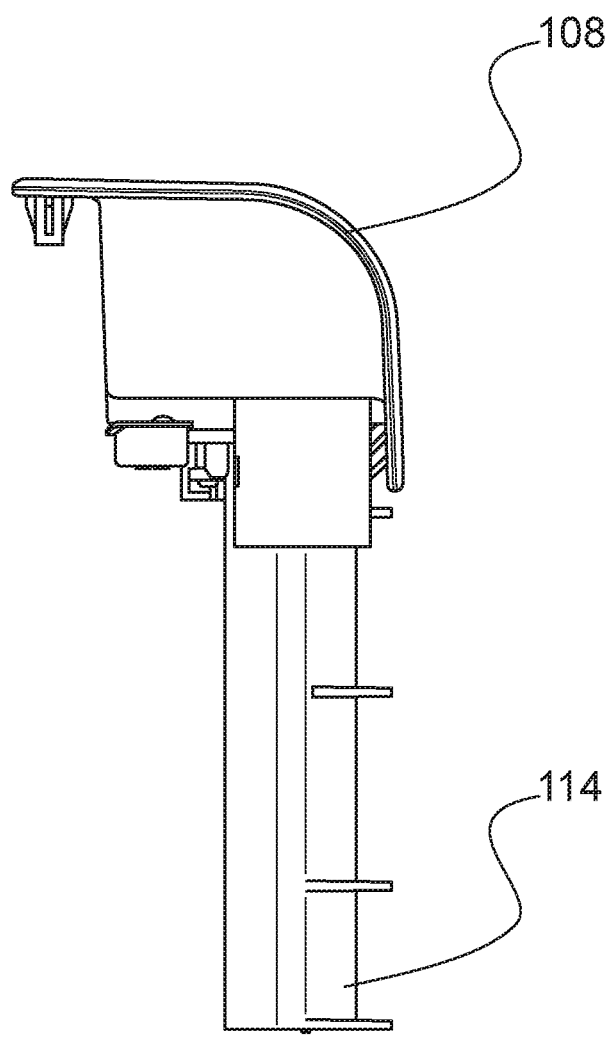
Figure 7:
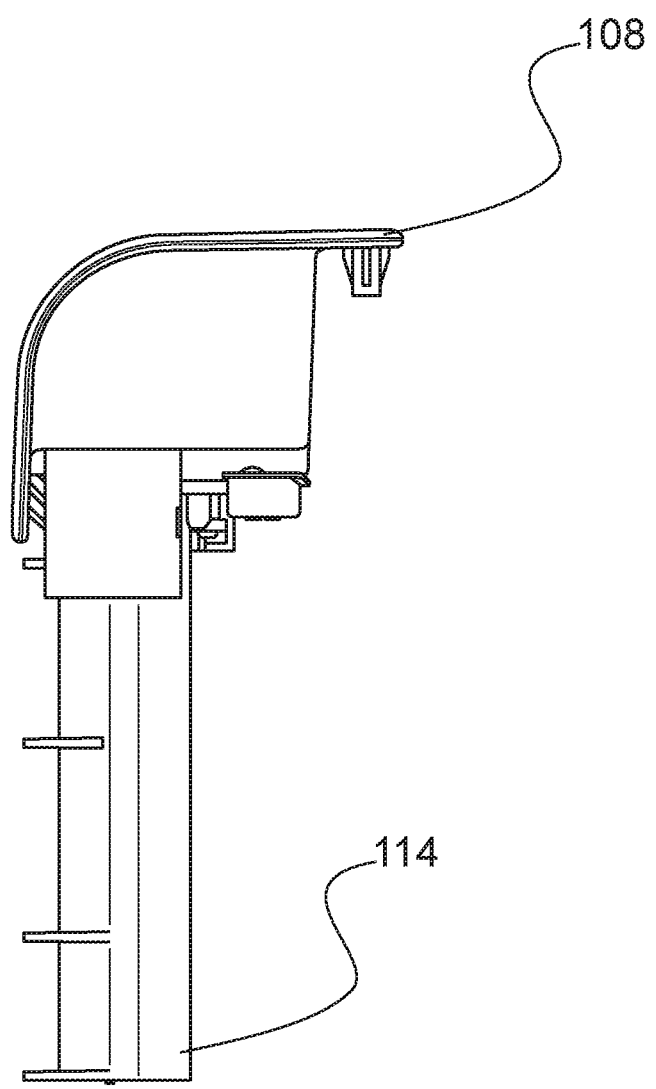
Figure 8:
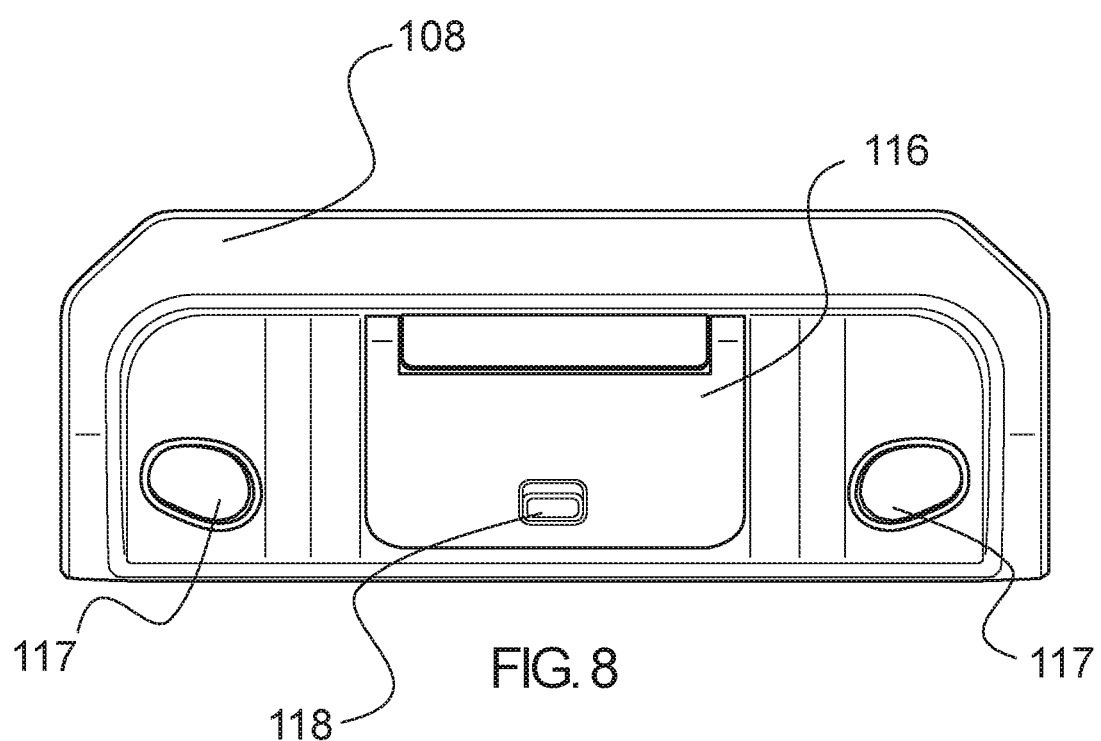
Figure 9:
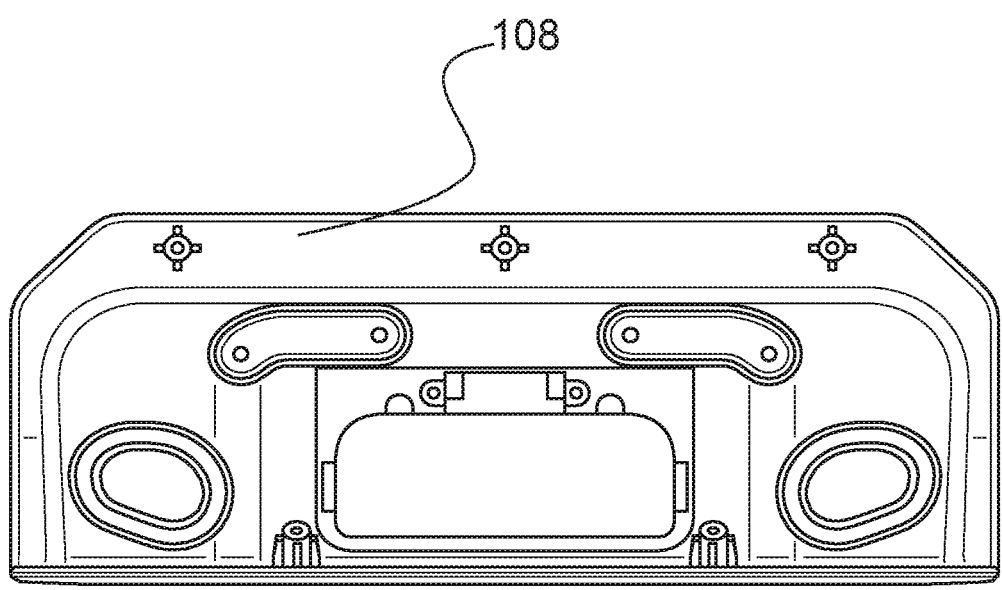
Figure 10:
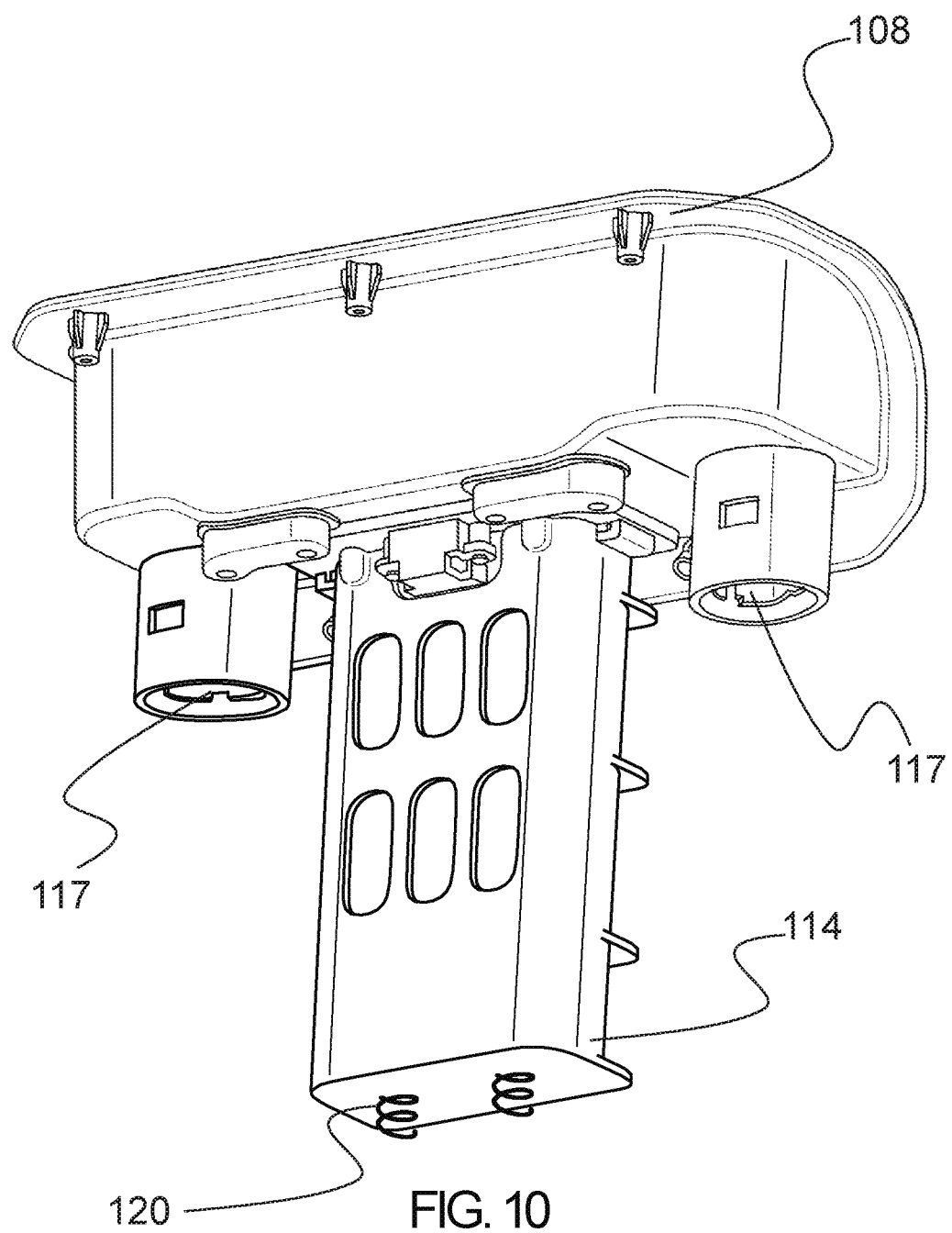
Figure 11:
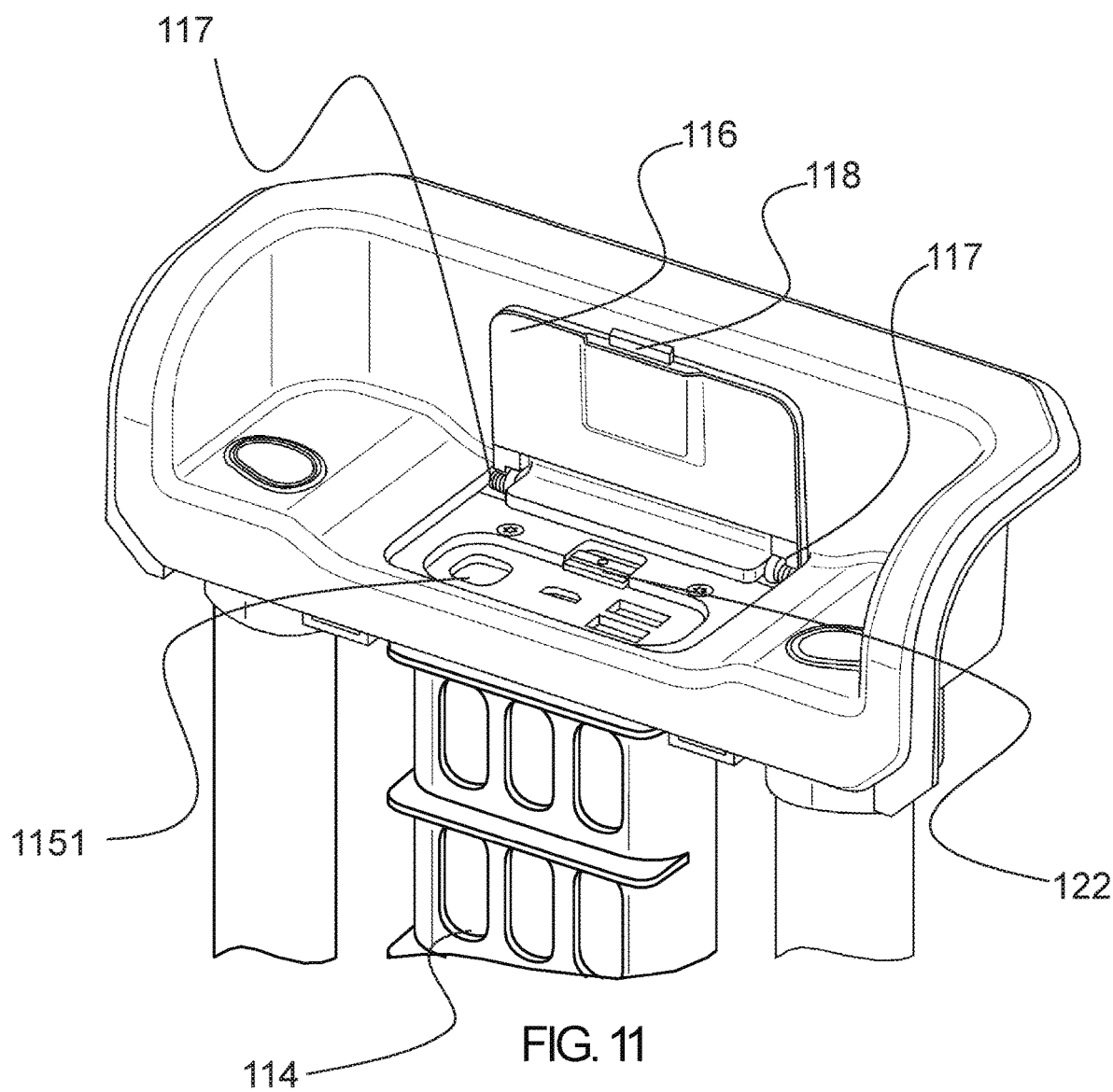
Figure 12:
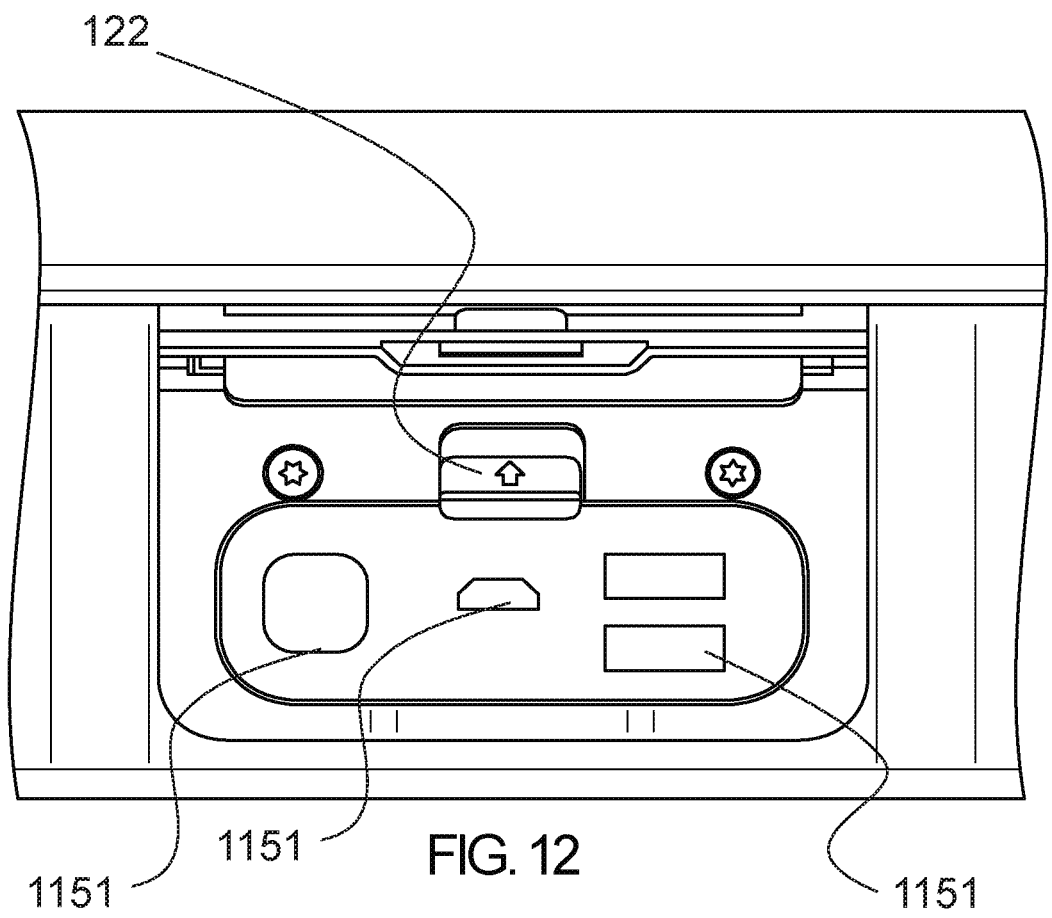
Figure 13:
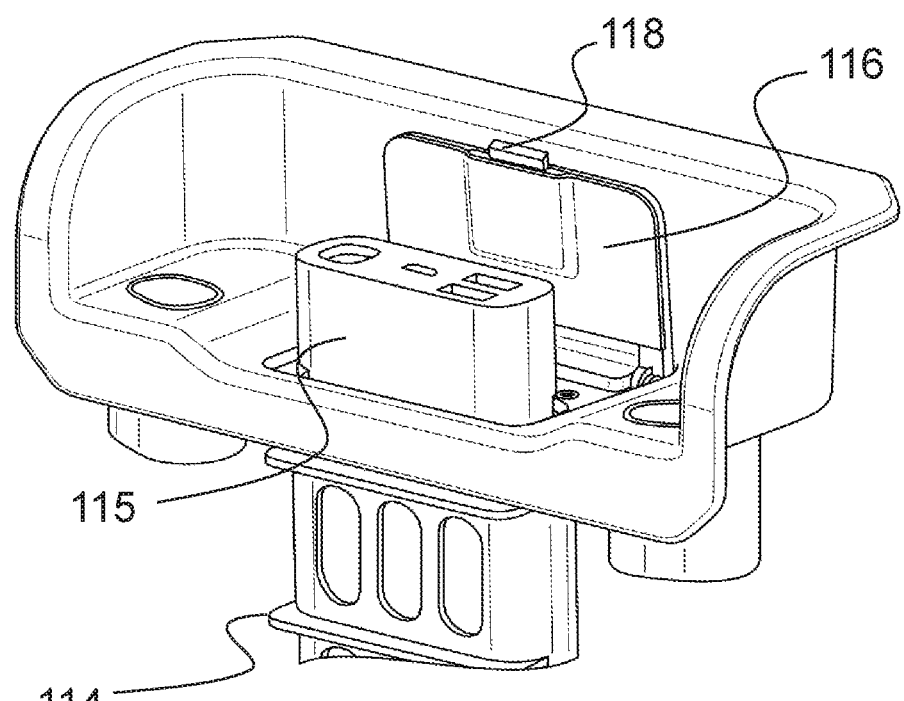
Figure 14:
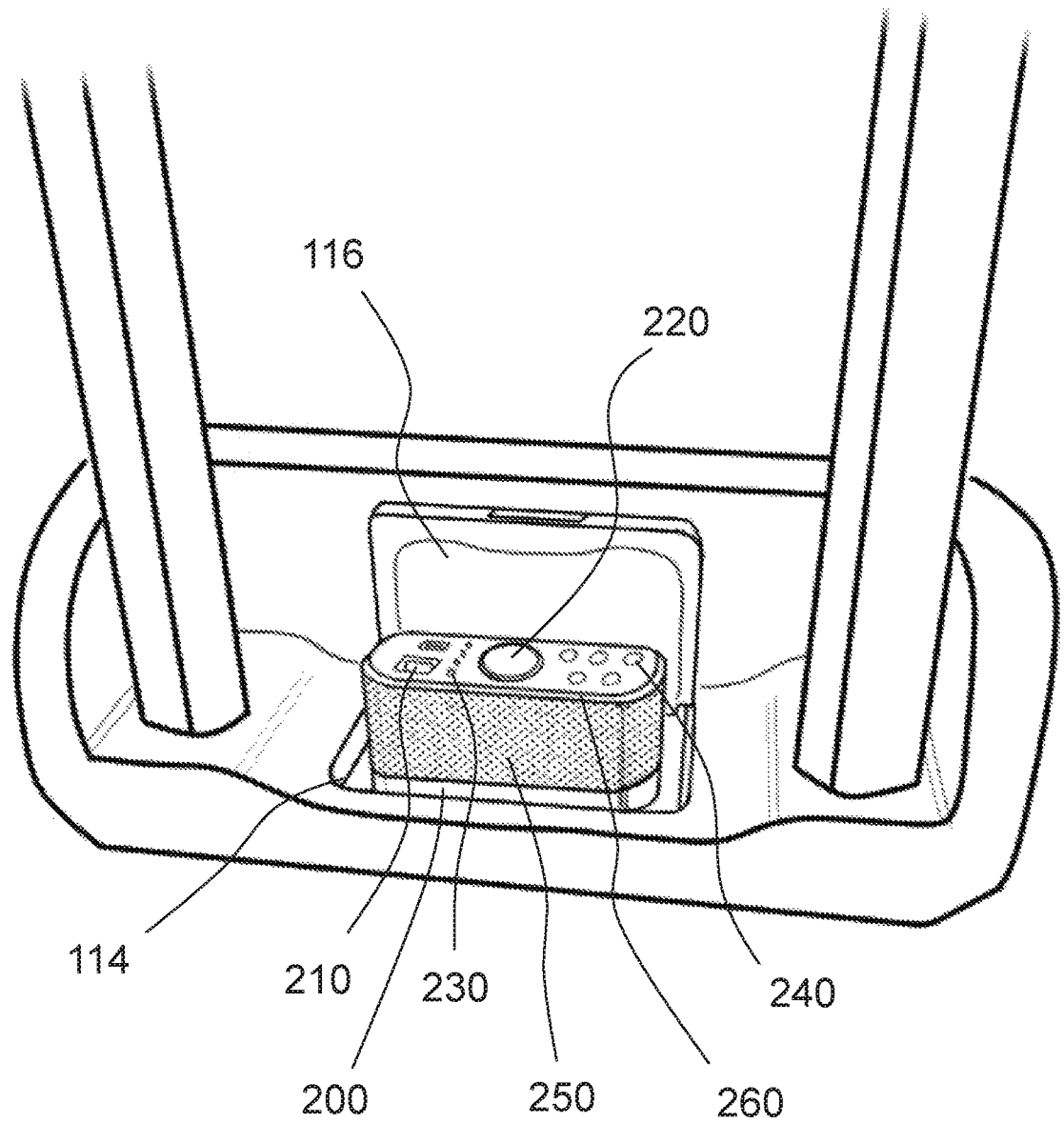
Figure 15:
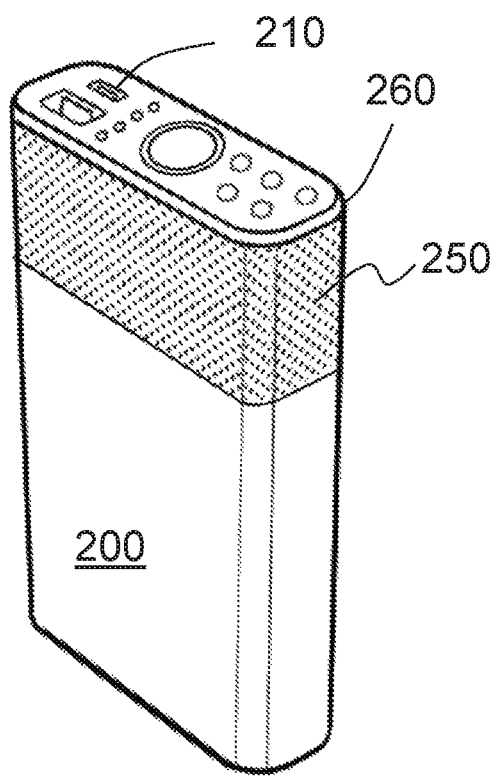
Figure 16:
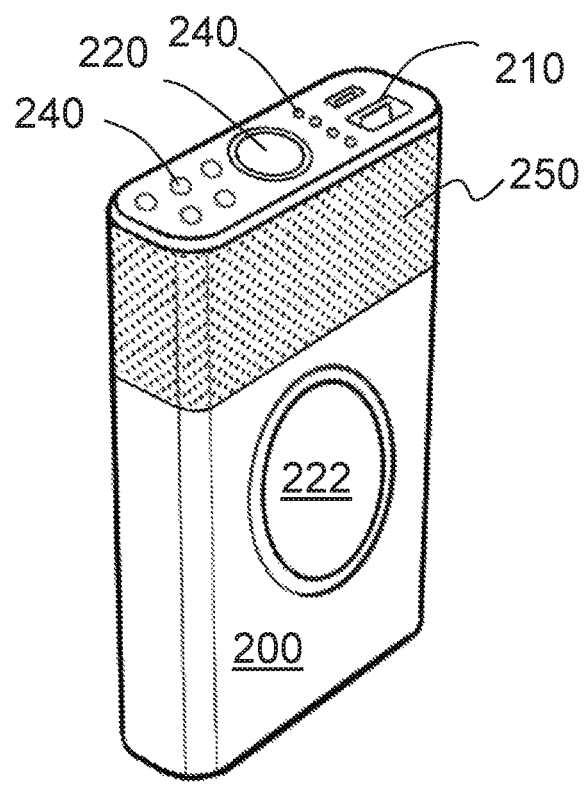
Figure 17:
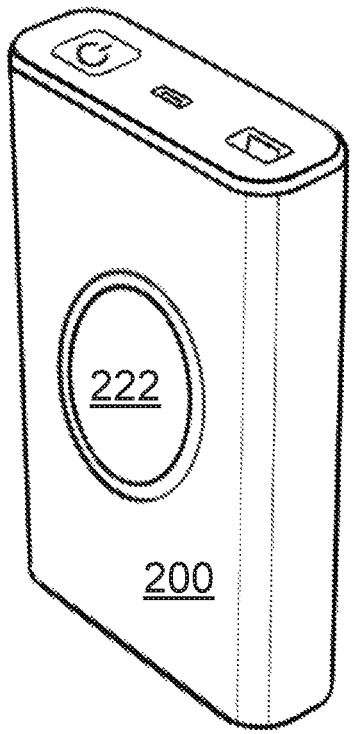
Figure 18:
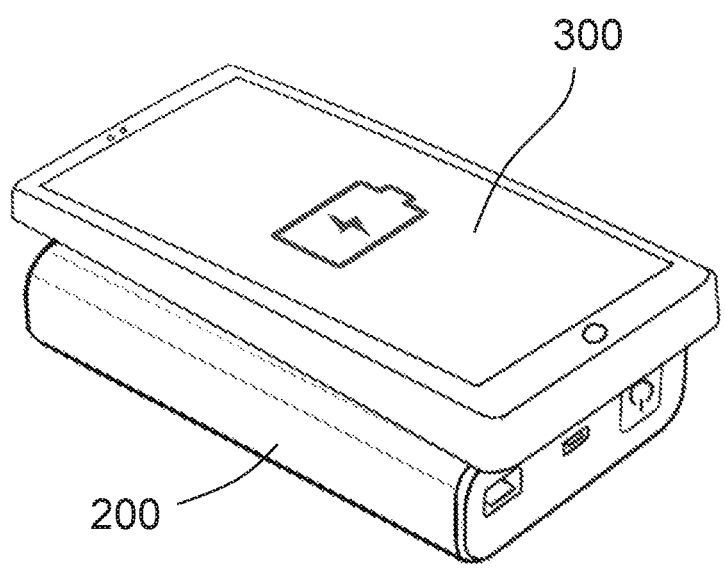
Figure 19:
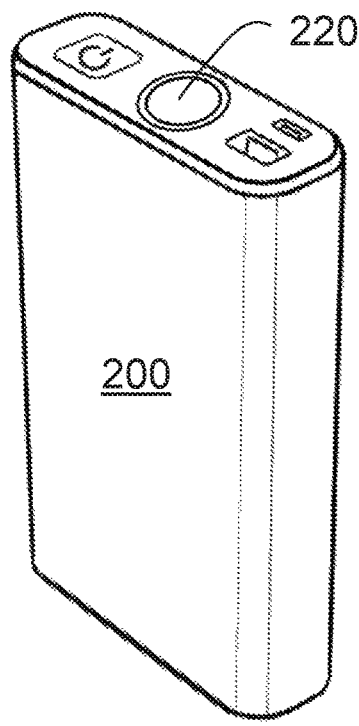
Figure 20:
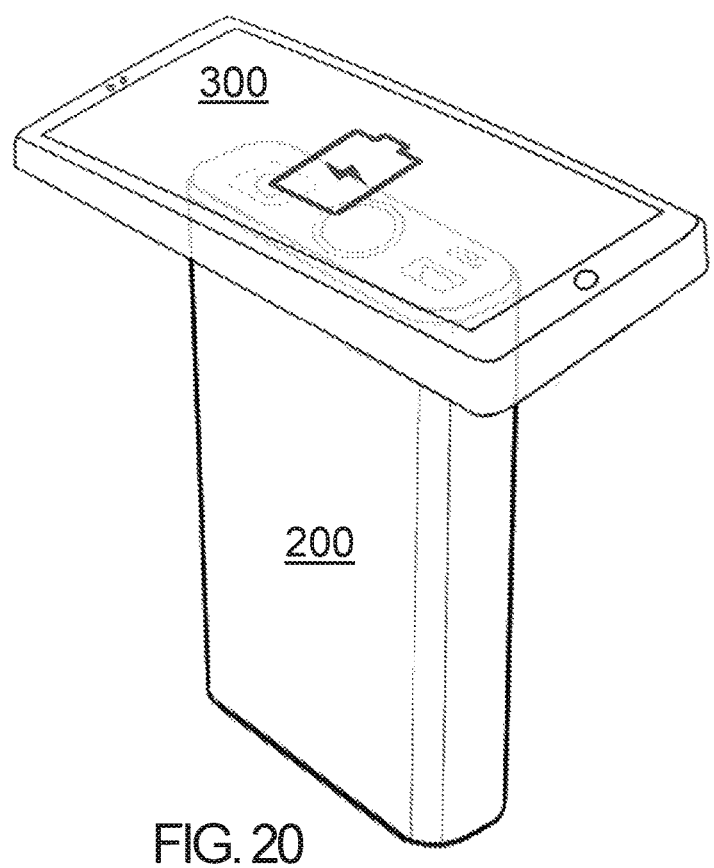

Exemplary FIG. 2 may show an exemplary embodiment of an electronic luggage device;

Exemplary FIG. 3 may show a front perspective of the handle housing fixture and battery housing fixture of an electronic luggage device;

Exemplary FIG. 4 may show a front elevation view of a handle housing fixture and battery housing fixture of an electronic luggage device;

Exemplary FIG. 5 may show a rear elevation view of a handle housing fixture and battery housing fixture of an electronic luggage device;

Exemplary FIG. 6 may show a left elevation view of a handle housing fixture and battery housing fixture of an electronic luggage device;

Exemplary FIG. 7 may show a right elevation view of a handle housing fixture and battery housing fixture of an electronic luggage device;

Exemplary FIG. 8 may show a top plan view of a handle housing fixture and battery housing lid of an electronic luggage device;

Exemplary FIG. 9 may show a bottom plan view of a handle housing fixture of an electronic luggage device;

Exemplary FIG. 10 may show a rear perspective of a handle housing fixture and battery housing fixture of an electronic luggage device;

Exemplary FIG. 11 may show a front perspective view of a handle housing fixture and battery housing fixture with a battery housing lid in an open position of an electronic luggage device;

Exemplary FIG. 12 may show a top plan view of a battery, battery containment mechanism, and battery ports of an electronic luggage device;

Exemplary FIG. 13 may show a front perspective view of a handle housing fixture and battery housing fixture with a battery housing lid in an open position where the battery is shown during the process of removal from an electronic luggage device;

Exemplary FIG. 14 may show a front perspective view of a handle housing fixture and battery housing fixture with a battery housing lid in an open position where the battery is shown during the process of removal from an electronic luggage device;

Exemplary FIG. 15 may show a battery;

Exemplary FIG. 16 may show a battery;

Exemplary FIG. 17 may show a battery;

Exemplary FIG. 18 may show a battery charging an external device;

Exemplary FIG. 19 may show a battery;

Exemplary FIG. 20 may show a battery charging an external device; and

Figure 21:
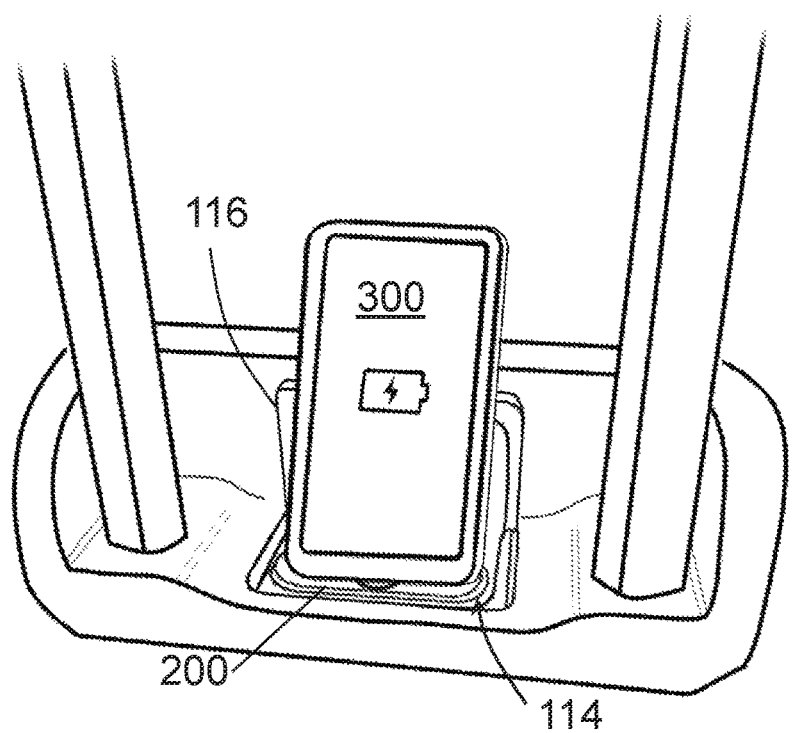

Exemplary FIG. 21 may show a battery charging an external device while inserted in a battery housing fixture.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage, or mode of operation.

Further, many of the embodiments described herein may be described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, "a computer configured to" perform the described action.

According to an exemplary embodiment, an electronic luggage device 100 may be disclosed. The electronic luggage device 100 may have a luggage enclosure 107 with a top side and a bottom side as would be understood by a person having ordinary skill in the art. A plurality of wheels 102 may be disposed on the bottom side of the luggage enclosure 107. The wheels 102 may be rotational vertically along the major axis of the electronic luggage device. The wheels 102 may also be rotational perpendicular to the major axis of the electronic luggage device such that they may spin 360 degrees freely. The wheels 102 may have a lock, clamp, or other apparatus as understood by a person having ordinary skill in the art such that the wheels 102 may be prevented from rotating by engaging the wheel lock. The electronic luggage device 100 may have a bumper 104 disposed on the exterior of the luggage enclosure 107. The bumper 104 may be composed of rubber, plastic, or coated by any suitable material. The bumper 104 may prevent damage to the electronic luggage device 100 by providing a rigid support member, protection, and shock absorption. The bumper 104 may protrude from the luggage enclosure 107 of the electronic luggage device 100. The electronic luggage device 100 may have a groove 106 or a plurality of grooves 106 along or across the luggage enclosure 107 of the electronic luggage device 100. The groves 106 may reduce the surface area of the electronic luggage device 100 that may come into contact with an alternate surface plane thereby facilitating easy sliding of the electronic luggage device 100 in luggage carriers, bins, and other locations. For example, if the electronic luggage device 100 is placed on its side a user can easily slide the luggage because of the reduced surface area of the electronic luggage device 100 in contact with the alternate surface plane. The groove 106 may also provide structural reinforcement of the luggage enclosure 107 of the electronic luggage device 100.

In a further exemplary embodiment, the electronic luggage device 100 may have a handle housing fixture 108 disposed on the top of the luggage enclosure 107. The handle housing fixture 108 may be composed of a rigid plastic or other suitable material. The handle housing fixture 108 may provide a recessed location for a telescoping handle 109. The telescoping handle 109 may slide up and down through void spaces 117 on opposing ends of the handle housing fixture 108. The handle housing fixture 108 may be further coupled to a battery-housing fixture 114. Alternatively, the battery-housing fixture 114 may be optionally coupled to the handle housing fixture 108. The battery 115 may be capable of wireless or wired charging as would be understood by a person having ordinary skill in the art. Furthermore, the battery may be of any type, form factor, or capacity as would be understood by a person having ordinary skill in the art.

In a further exemplary embodiment, the battery-housing fixture 114 may be coupled to the underside of the handle housing fixture 108. The battery-housing fixture 114 may house a battery 115 within the interior of the battery-housing fixture 114. The battery 115 may be any type of battery understood by a person having ordinary skill in the art. For example, the battery 115 may be a lithium ion battery 115 or it may be a pliable gel type battery 115 as would be understood by a person having ordinary skill in the art. The battery 115 may be disposable, it may be re-chargeable, or it may be a high capacity lithium ion battery. The battery 115 may have an intelligent sleep mode to facilitate power savings. The battery 115 may also have a charge status indication feature and further indications such as flashing LED lights or other indication apparatus that would be understood by a person having ordinary skill in the art. It should be noted that the battery 115 may additionally be any type of equivalent battery that may be produced in the future. The battery 115 may be commonly referred to as a "power pack" or "juice-pack" by electronics enthusiasts. The battery 115 may have a plurality of electronic ports 1151 disposed on an end of the battery 115 such that they are accessible when the battery is enclosed within the battery housing fixture 114. The electronic ports 1151 may be a USB style port such as a USB 1.0, USB 2.0, USB 3.0, Micro USB, USB-C or other future revisions as would be understood by a person having ordinary skill in the art. Furthermore, the electronic ports 1151 can be tailored to other arrangements and configurations as would be understood by a person having ordinary skill in the art. Furthermore, the electronic ports 1151 may optionally be capable of two-way electric charging. Optionally, the battery 115 may have at least one dedicated electronic port 1151 for charging the battery 115 and the other electronic ports 1151 may be used for charging and communicating with other external devices.

According to a further exemplary embodiment, the battery-housing fixture 114 may have a battery-housing lid 116. The battery-housing lid 116 may have a hinged element 117 such that the battery-housing lid 116 may flip open, slide open, or swing open. The battery-housing lid 116 may be spring loaded such that when a lid latch mechanism 118 is activated the lid may automatically provide a modest opposing force. The modest opposing force may be any reasonable force to accomplish raising the battery-housing lid 116 thereby retaining the battery-housing lid 116 in an open position. The lid latch mechanism 118 may be any retaining mechanism as would be understood by a person having ordinary skill in the art. For example, the lid latch mechanism 118 may be a tongue and grove style, it may be a force-loaded latch and lever, a hinge, or it may be as simple as a retaining screw. It should be noted that the lid latch mechanism 118 may be located in any region of the battery housing lid 116, the battery housing fixture 114, the handle housing fixture 108 or any tither alternate location of the electronic luggage device 100.

The battery-housing fixture 114 may have a battery spring 120. Alternatively, the battery-housing fixture 114 may have a spring 120 or a plurality of springs 120. The battery-housing fixture 114 may have a slide and rail such that the battery 115 may slide up and down a track within the battery-housing fixture 114. The battery-housing fixture 114 may be sized to accept various sizes and types of batteries 115. Furthermore, the battery-housing fixture 114 may be sized to accept multiple batteries 115 in multiple orientations. The battery-housing fixture 114 may be designed to provide additional circuity to allow multiple batteries 115 to be connected in series or in parallel. The battery 115 may be removable from the battery-housing fixture. The battery 115 may be retained within the battery-housing fixture and underneath the battery-housing lid 116 by a battery containment mechanism 122. The battery containment mechanism 122 may be a twist latch, a locking latch, a screw/bolt or frictional force, elastic force, magnetic force or any containment apparatus that would be understood by a person having ordinary skill in the art.

In a further embodiment, the battery 115 may be coupled to a Global Positioning Device ("GPS"). The GPS device may be toggled to an on or off position. Alternatively, the electronic luggage device may optionally have a GPS device. The GPS device may be housed within a GPS housing fixture and removable from the electronic luggage device with substantially the same structure as that of the battery 115. The GPS device may optionally be housed alongside the battery 115 within the battery-housing fixture 114. The battery 115 and GPS device may be re-chargeable from within the electronic luggage device 100 or they may be removed and re-charged externally from the electronic luggage device 100. The electronic luggage device 100 may have additional storage locations for additional batteries 115. The electronic luggage device 100 may have alternate charging port locations such that the battery 115 may receive an electronic current indirectly from an alternate charging port contained elsewhere in the electronic luggage device 100. The battery 115 may optionally be capable of wireless charging as would be understood by a person having ordinary skill in the art.

In a further embodiment, the electronic luggage device may have an engraving to identify the owner of the electronic luggage device 100 or to identify the manufacturer of the electronic luggage device 100. The engraving may be located at any location of the electronic luggage device. The electronic luggage device 100 may have a side handle 128, a top handle 112, and a telescoping handle 109. The telescoping handle 109 may retract through a void space 117 within the luggage enclosure 107 of the electronic luggage device 100 such that the telescoping arms may not be viewable from a closed position. The telescoping handle may have a release button 111 on the top of the handle. The release button 111 may engage a lock contained within the interior of the telescoping handle that prevents the telescoping arms from extending to an open position. The electronic luggage device 100 may further have rounded edges 130 disposed on the luggage enclosure 107. The electronic luggage device 100 may optionally have a side lock 110 disposed on the opening side of the luggage enclosure 107 as would be understood by a person having ordinary skill in the art. The side lock 110 may be a combination style, pin style, or electronic lock. The side lock 110 may be electronically operable from the handle housing fixture 108, the battery-housing fixture 114, or an external electronic device such as a smart phone via the wireless communicatory receiver 132.

The electronic luggage device may have a wireless communicatory receiver 132. The wireless communicatory receiver 132 may optionally be disposed on the outside of the battery-housing fixture 114 or the handle-housing fixture 108. The communicatory receiver 132 may be a standalone electronic device that may send wireless data to other electronic devices both internal and external to the electronic luggage device. It may also be integrated as a single unit within the battery 115. The electronic luggage device 100 may also have a communicatory output 134 that is capable of appraising other electronic devices both internal and external to the electronic luggage device 100 of a series of status indications. Exemplary status indications may be; percent charged, GPS location, time remaining on a flight, last known location, time of day, weather and other status indications as would be understood by a person having ordinary skill in the art.

An exemplary method in which the electronic luggage device may communicate with an external electronic device may be disclosed. The electronic luggage device may send a signal that the battery power, GPS location, or electronic locks are activated/not activated to a smart phone or a display. The display may be disposed on the electronic luggage device 100 or it may be an external display such as the display screen of a smart phone or tablet. In at least one example, the smart phone may be equipped with a specific computer operated algorithm or a smartphone app that can communicate with the electronic luggage device 100. The app may be used to display the battery power, GPS location, or electronic lock status on the display screen of the smartphone. The display screen may be viewed by an end user or the status may be shared by the smartphone across the World Wide Web to any other cloud-based service or software program. The external electronic device should not be construed as limited to a smartphone as other electronic devices may further be coupled in a communicatory state to the electronic luggage device in contemplated and advantageous ways as would be understood by a person having ordinary skill in the art.

An exemplary method in which the electronic luggage device 100 may charge external electronic devices may be disclosed. A user may open the battery-housing lid 116 by toggling the lid latch mechanism 118 thereby allowing the hinged element 117 to provide a modest force and open the battery-housing lid 116. The battery-housing lid 116 may swing to an open position thereby partially exposing the battery 115 and the electronic ports 1151. Next, a user may insert a charging cord, such as a USB style cord, into the electronic port 1151. A user may insert the charging cord into an external electronic device such as a smart phone, tablet, PDA, laptop or other re-chargeable electronic device. A user may further insert an external charging cord into a standard electrical outlet. The charging cord may be insert into an electronic port 1151 of the battery 115 of an electronic luggage device 100. The charging cord may provide electricity from the electrical outlet to the battery 115 thereby allowing the battery 115 to receive and retain an electric charge.

An exemplary method in which an individual may remove a battery 115 from an electronic luggage device 100 may be disclosed. A user may open the battery-housing lid 116 by toggling the lid latch mechanism 118 thereby allowing the hinged element 117 to provide a modest force and open the battery-housing lid 116. The battery-housing lid 116 may swing to an open position thereby partially exposing the battery 115 and the electronic ports 1151. A user may toggle the battery containment mechanism 122 to an open position. A spring 120 may provide a modest upward force causing the battery 115 to protrude from the battery-housing fixture 115. Optionally, a user may pull on the battery and it may slide out of the battery-housing fixture 115 along a track and rail system Now referring to exemplary FIG. 14-23, a battery 200 may include at least one electronic port 210, which may be capable of charging an external device, receiving a charge for the battery, or transferring data. Port 210 may be a USB, micro USB, mini USB, Lightning, or other type of port as would be understood by a person having ordinary skill in the art. In some embodiments, battery 200 may have an integrally connected cord. Furthermore, battery 200 may have a wireless charging module 220. Wireless charging module 220 may be disposed on a top surface 202 of the battery 200 and may allow for wireless charging of an external device. Battery 200 may further include a second wireless charging module 222, which may be disposed on a front or rear face of battery 200 and may optionally provide a larger contact area for a device to be charged. In some embodiments, wireless charging module 220 or an additional wireless charging element may provide for wireless charging of the battery. Wireless charging may include radio charging, inductive charging, resonance charging, or other forms of wireless charging as would be understood by a person having ordinary skill in the art. Battery 200 may further include at least one power or charge indicator 230. For example, battery 200 may include at least one LED indicator 230, which may show a level of remaining battery power or charge. In some embodiments, indicator 230 may include four LED lights, which may illuminate individually based on the level of charge, as would be understood by a person having ordinary skill in the art. Battery 200 may also include operational buttons 240, which may optionally include volume control, Bluetooth control, WiFi control, battery power, and/or privacy/mute control. In an exemplary embodiment, battery 200 may include a volume up "+" button, a volume down "−" button, a Bluetooth on/off button, a battery on/off button, and a privacy mode button, which may mute or unmute a microphone. Battery 200 may further include a GPS transceiver integrally formed within the battery structure.

Battery 200 may further include a microphone for receiving voice commands and/or receiving voice for transmission to other devices. Battery 200 may also include a speaker 250, which may provide audio to a user. In some embodiments, the speaker 250 may include a combination of a speaker and microphone. Speaker 250 may be a smart speaker, which may allow user interaction, as would be understood by a person having ordinary skill in the art. Lastly, battery 200 may also have an illumination element 260, which may work in coordination with speaker 250. In an exemplary embodiment, illumination element 260 may be a strip extending around a top edge of the battery, which may illuminate when a command is received by a microphone or smart speaker 250, when audio is played through speaker 250, or when a smart speaker 250 may be processing. In some embodiments, the battery housing fixture 114 may hold battery 200 so that speaker 250 is exposed above the battery housing 114. This may be accomplished, for example, through a battery spring, as described above. Furthermore, the battery housing may include a retaining element, which may include a notch or friction lock, for maintaining battery 200 in such a position. In other embodiments, battery 200 may be loosely held in the battery housing such that the speaker is exposed above the battery housing 114.

According to an exemplary embodiment as provided herein, an external device, such as a smartphone or other personal communication device, which may have the ability to be wirelessly charged may be placed on the telescopic handle platform over either the top portion of the battery. The battery may wirelessly charge the device when the battery housing lid 116 is in an open position or closed position. The wireless charging functionality may therefore be possible through the battery housing lid 116. Devices may be wirelessly charged when the battery is in the battery housing 114 or outside of the battery housing 114. Exemplary FIG. 21 may show an external device 300 being wirelessly charged when battery 200 is retained in the battery housing 114. Furthermore, battery 200 may wirelessly charge an external device 300 when battery 200 is released from the luggage entirely. The battery 200 may therefore be used independently of the luggage, as shown in the Figures.

According to some further embodiments, battery 200 may be charged using a wire and adapter via a port on the battery that may be connected to direct current or battery 200 may be wirelessly charged through a charging base that may be connected to a direct current.

As discussed above, battery 200 may include a speaker 250, which may be a smart speaker. The battery 200 with an integrated smart speaker 250 may be capable of operating as an individual smart speaker in addition to the battery, wired or wireless charging, and electronic luggage functionality described herein. The smart speaker 250/battery 200 combination may therefore charge wirelessly and/or wirelessly charge external devices. Through smart speaker 250, voice-based services may be provided. Voice-based services may include controlling smart home devices, such as lights, set timers, make coffee, etc. Furthermore, information may be requested through voice-based services utilizing voice commands to retrieve information, such as news, weather, flight schedules, and calendar information, among other information as would be understood by a person having ordinary skill in the art. By incorporating smart speaker 250 into battery 200, transportation and travel with smart speaker 250 may be made convenient, particularly through the integration in a battery housing fixture within luggage. Smart speaker 250 may provide for integration with third party platforms, including smart voice platforms, such as Amazon Alexa® and Google Home™. Smart speaker 250 may integrate or communicate with such platforms by connecting over a WiFi network or through a Bluetooth connection to a smart device, such as a smart phone. Furthermore, smart speaker 250 may play music or other media through such a connection with an external device. Smart speaker 250 may therefore include at least one communications module, such as a WiFi or Bluetooth transceiver. In some exemplary embodiments, smart speaker 250 may further include a cellular or satellite transceiver, as would be understood by a person having ordinary skill in the art.

Utilizing a voice-based platform from a standalone smart speaker, such as smart speaker 250 may allow a user to control a smart home from anywhere. This may allow a traveling user to take certain precautions such as turning on and off lights, which may be used to give the appearance that someone is home or to control energy usage, adjusting temperature and thermostat settings, and to check and/or control door locks. The connected smart speaker 250 may further allow a user to stream media. It may also be possible to build travel routines through the voice platform. These routines may be built to match an itinerary and may also be utilized as an alarm clock. Furthermore, the smart speaker 250 and a voice platform implemented through the smart speaker 250 may allow for a mobile concierge service. For example, a user may search for the closest coffee shop, a restaurant with a particular cuisine, or a nearby departments store, etc. This may also be implemented using a GPS transceiver incorporated in the smart speaker 250.

According to some further exemplary embodiments, smart speaker 250 may facilitate a "skill" or voice-first front end, which may understand customer intents and deliver responses utilizing a back-end cloud service to process intents. "Content skills" may be created to provide customers with relevant information on a recurring basis, such as a daily flash briefing on travel related topics. This may also include longer form and more in-depth "content skills" that may give a customer the ability to choose between topics, stories and games. Skills may optionally be provided on a subscription basis.

Smart speaker 250 may be designed to fit in a battery housing fixture 114, and may include battery 200 or may be independent of battery 200. When the first latch is released, the smart speaker 250 may be partially exposed and pushed up by the spring mechanism, which may present the smart speaker 250 in a use state. Smart speaker 250 may have high fidelity acoustic sound technology that may allow a user to listen to music, access information and give instructions by voice commands. The sound from the smart speaker may be played either in a locked position or in the partially exposed position, as described herein. The partially exposed position may amplify the sound further, as the 360 degree built in speaker may be directly exposed above the battery housing, as shown in exemplary FIG. 14. An external device, such as a personal smartphone, tablet or laptop may connect to the smart speaker by Bluetooth and may be used to stream music, control or adjust settings of the smart speaker, or otherwise perform functions utilizing the connection. Furthermore, the smart speaker may include WiFi connectivity. WiFi connectivity may be used to access voice-based services or other platforms, which may be cloud-based.

According to some exemplary embodiments, the smart speaker may be waterproof or water resistant. The smart speaker may also feature analog controls to manually adjust volume, mute, power, or Bluetooth functionality. The smart speaker may also allow for over the air software updates. The smart speaker may include electronic ports, such as USB ports, for charging personal devices. Additionally, the smart speaker may allow for wireless charging of compatible personal electronic devices such as smartphones. Charging may be performed by placing the external device on the base of the handle housing with the battery housing lid either in an open or closed position. The external device may also be charged by manually removing the smart speaker from the electronic luggage and placing the battery on a surface and subsequently placing the phone on a wireless charging surface of the battery. The smart speaker may be charged using any of its ports, which may be connected to a power source by wire or it may be wirelessly charged by removing the smart speaker from the battery housing fixture and placing it on a wireless charging base that is connected to a power source. Lastly, the smart speaker may have a battery status indicator, which may for example be a series of LEDs, and which may show the remaining power level of the smart speaker's built in battery.

As described and shown herein, the battery 200 and combination battery 200 with smart speaker 250 may take advantage of previously wasted real estate in a piece of luggage by fitting in a battery housing disposed in the void between luggage handle rods.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:
1. An electronic luggage device comprising:
   a luggage enclosure;
   a battery-housing fixture coupled to the luggage enclosure; and
   a removable battery housed within the battery-housing fixture, wherein the battery comprises at least one wireless charging module and a smart speaker having a microphone.
2. The electronic luggage device of claim 1, wherein the battery is retained within the battery-housing fixture by a containment mechanism.

3. The electronic luggage device of claim 2, wherein the containment mechanism comprises a battery containment latch for engaging a top surface of the battery.

4. The electronic luggage device of claim 1, wherein the battery-housing fixture further comprises a lid and lid latch for closing the battery-housing fixture.

5. The electronic luggage device of claim 4, wherein the at least one wireless charging module is exposed on a top surface of the battery when the battery is retained in the battery-housing fixture and the lid is open.

6. The electronic luggage device of claim 1, wherein the removable battery further comprises a plurality of electronic ports.

7. The electronic luggage device of claim 6, wherein the plurality of electronic ports are accessible when the battery is retained in the battery-housing fixture and the battery-housing fixture lid is open.

8. The electronic luggage device of claim 1, wherein the removable battery is ejected by the assistance of a spring within the battery-housing fixture.

9. The electronic luggage device of claim 1, further comprising a GPS device within the luggage enclosure.

10. The electronic luggage of claim 1, wherein the battery further comprises at least one button for controlling the speaker.

11. The electronic luggage of claim 1, wherein the battery further comprises at least one illumination strip.

12. The electronic luggage device of claim 1, wherein the battery has a first wireless charging module on a top surface of the battery and a second wireless charging module on a front face of the battery.

13. The electronic luggage device of claim 1, wherein the battery is partially ejected by the assistance of at least one spring within the battery-housing fixture, and wherein the distance of partial ejection is configured to expose the smart speaker outside of the luggage enclosure.

14. The electronic luggage device of claim 1, further comprising a communication module within the luggage enclosure.

15. The electronic luggage device of claim 14, wherein the communication module is at least one of Bluetooth or WiFi.

16. The electronic luggage device of claim 1, wherein the battery further comprises at least one charge indicator.

17. The electronic luggage device of claim 1, wherein the at least one wireless charging module is configured to wirelessly charge an external device.

18. The electronic luggage device of claim 1, further comprising at least one wireless charging element for wirelessly charging the battery.

* * * * *